Feb. 7, 1967     G. T. DOWNEY     3,302,796
BARRIER FILTER ELEMENT ASSEMBLY
Filed Feb. 28, 1964     2 Sheets-Sheet 1
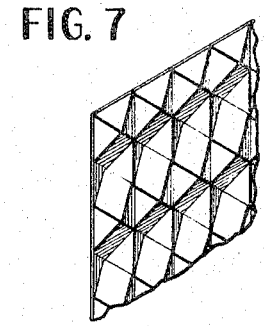
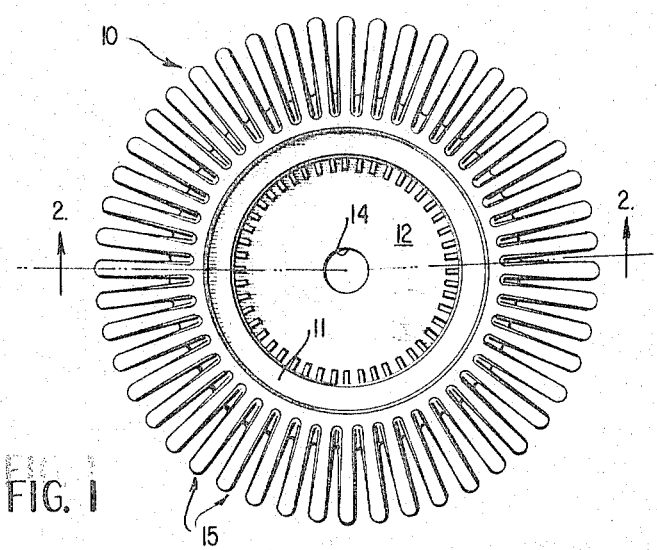
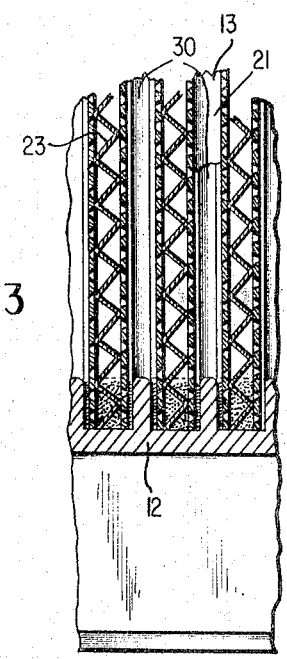
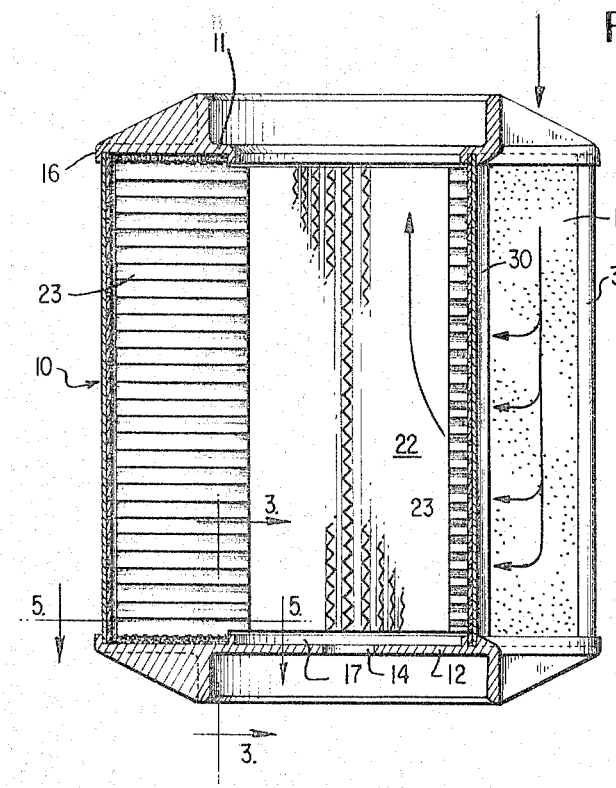
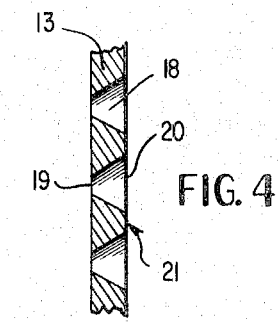
INVENTOR.
GEORGE T. DOWNEY
BY Robert B. Harmon
ATTORNEY INVENTOR.
GEORGE T. DOWNEY
BY Robert B. Harmon
ATTORNEY

United States Patent Office 3,302,796
Patented Feb. 7, 1967

3,302,796
BARRIER FILTER ELEMENT ASSEMBLY
George T. Downey, Corry, Pa., assignor to Aero-Flow Dynamics, Inc., Corry, Pa.
Filed Feb. 28, 1964, Ser. No. 348,161
1 Claim. (Cl. 210—487)

This invention relates generally to removable fluid filters, and particularly to filter elements having a non-collapsible pleated construction.

This invention further relates to a pleated filter element constructed with a filtering material having particularly shaped pores.

Many fluid filters have the filtering medium arranged in pleated form to increase the filter surface. This increase in surface area permits a faster rate of fluid flow for a given size filter housing.

An inherent disadvantage of filter elements of the prior art generally arises from the construction of the filter material itself. Heretofore, filter units have been constructed in which the filter material was provided with pore passages of random shaped cross-section. In such cases, the filter media became clogged when undesirable particles in the fluent material lodged in the pores. Thus, the filter media was susceptible to contaminant clogging which could not be easily rectified. This lodging or wedging of contaminant material particularly occurs in the filter pores which have a narrower opening on the downstream side than on the upstream side of the unit.

A disadvantage of pleated filter units arises during use. As fluid flows into the filter housing, through the filter, and out through the central portion of the housing, the fluid pressure on the outside, or upstream side, of a single pleat becomes greater than the fluid pressure on the inside, or downstream side, of the same pleat. This pressure differential tends to press the contiguous sides of the pleat together thus partially decreasing the rate of fluid flow and defeating the purpose of a pleated filter cartridge. The filter element constructed in accordance with this invention is not hampered by the foregoing disadvantages.

It is therefore desirable to construct a pleated filter element to avoid pleat collapse. It is also desirable to construct a filter element in which the filtering media has passages which are smaller on the upstream side than on the downstream side of the filter. Holes in the form of a truncated pyramid or cone are the most desirable. Thus, any undesirable matter which is too large to enter the passage will remain on the material surface. In like manner, any material small enough to enter the passage will see a larger opening and will easily flow through the filter without becoming inescapably lodged.

In order to protect the pleats from collapsing, one form of filter element of this invention is provided with supporting spacers. The supporting spacers are preferably made of corrugated or dimpled sheet material and are placed in the downstream fold of each pleat. In as much as the filter unit is to be removed from the filter housing for inspection purposes, these spacers are also preferably made of reflective material to facilitate inspection. Thus, when the filter unit has been removed from its housing and a source of light placed in the central portion of the unit, the light and the reflecting spacers will enable an observer to easily ascertain any foreign material adhering to the outer surface of the filter media. Cleansing of the unit, if necessary, can then be easily accomplished by merely bathing the unit and softly brushing the outside surface.

In another form of this invention, to protect the pleats from collapsing, the filter element is provided with filtering material having a system of protrusions. The protrusions are provided in the filtering material to extend from at least one of the inner surfaces of each pleat to engage the opposing inner pleat surface in a point contact relation.

It is therefore a primary object of the present invention to provide a filter element having a filtering material with specially constructed pores to allow substantially unobstructed fluid flow for sustained periods of time by withholding large quantities of clogging material.

Another important object of the present invention is to provide a pleated filter element constructed with supporting spacers to prevent collapsing of the pleats while at the same time allowing a high rate of fluid flow.

Another important object of a modified form of the present invention is to provide a pleated filter element constructed without supporting spacers and with filtering material provided with a system of closely spaced protusions to prevent collapsing of the pleats.

Another object of the present invention is to provide a filter element which can be visually inspected and easily cleaned.

Another object of the present invention is to provide a pleated filter element having end caps with approximately the same shape as the top and bottom ends of the filter pleats.

With the foregoing and other objects in view the invention resides in the following specification and claim certain embodiments and details of construction of which are illustrated in the accompanying drawings in which:

FIGURE 1 is a top plan view of the filter element of this invention;

FIGURE 2 is a sectional view in side elevation of the filter element taken along line 2—2 of FIGURE 1;

FIGURE 3 is an enlarged fragmentary detail illustrating the assembly of the corrugated spacer within the folded pleats taken along lines 3—3 of FIGURE 2;

FIGURE 4 is an enlarged fragmentary detail illustrating the pore construction of the filter media;

FIGURE 7 is a fragmentary perspective view showing a modified form of pleat spacer within the contemplation of this invention.

Figure 6:
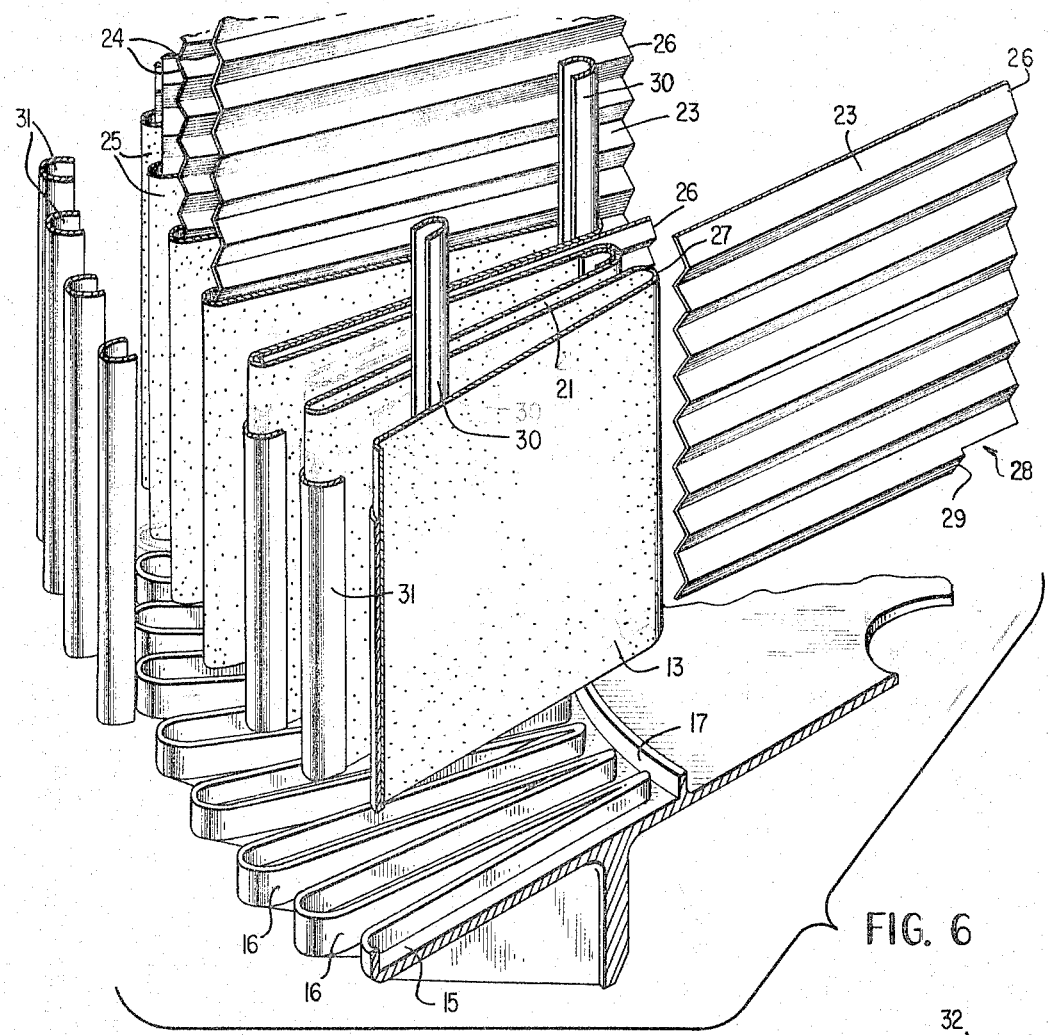
FIGURE 6 is an exploded sectional fragmentary view in perspective for clearly illustrating the assembly of a filter element within the contemplation of this invention.

Referring now to the drawings, there is shown in FIGURES 1 and 2, a normally vertical, generally cylindrically shaped filter element 10 having a top end cap 11 and a bottom end cap 12. The filter element 10 is provided with a sheet of filtering material 13 which is encapsulated in each end cap. The two end caps are identical with the exception of smaller opening 14 in the bottom cap for receiving attachment means to a filter bowl or housing (not shown). Each end cap is provided with radially extending web members 15, each such web member being provided with relatively short vertically extending side walls 16. A small circular ridge 17 is disposed on the inner face of each end cap. The filtering material 13 is folded and arranged in an annular or tubular configuration to form longitudinally extending pleats.

Referring to FIGURE 4, it is shown that each pore 18 of the filter material 13 is constructed with a small aperature 19 on one surface of the filter material and a larger aperture 20 on the opposite surface. The side walls of the pore passage so formed have a smooth increasing slope extending from the small aperture 19 to the larger aperture 20. Thus, each pore passage may appear in cross-section in the form of a generally symmetrical truncated pyramid or cone. The larger openings 20 of the pore passages 18 are all formed on the same side of the filter material.

Figure 5:
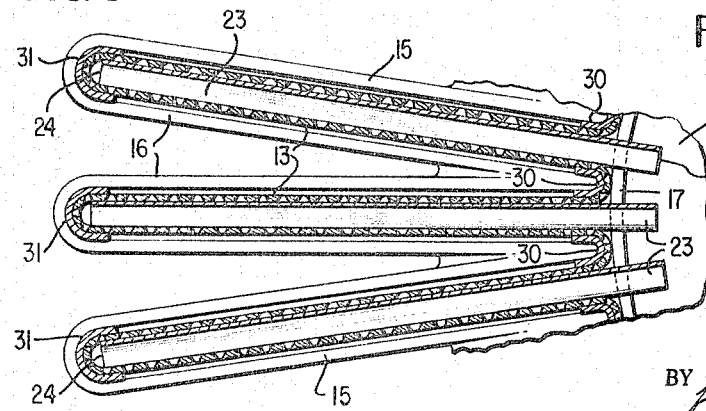
FIGURE 5 is an enlarged fragmentary detail taken along line 5—5 of FIGURE 2.

Referring to FIGURES 3 and 5, there is shown the particular manner in which the cylindrical shape of the filter material is arranged, the larger pore openings 20 are formed in the inner or downstream surface 21 of each pleat.

Normally, fluid flows through the filter element 10 in the direction indicated by the arrows in FIGURE 2. Inlet, or upstream, fluid passes through the webs 15 of the top end cap 11 and over the outer surface of the pleated material 13. Filtering of the fluid occurs as it passes through the pore passages from the small openings 19 on the upstream surface to the larger openings 20 on the filter surface facing inwardly of filter 10 on the downstream surface 21. From surface 21, the fluid passes into the central chamber 22 of the tubularly shaped filter element 10 and out through the top end cap 11.

Referring particularly to FIGURE 6, a spacer 23 is provided between facing downstream surfaces 21 of each filter pleat to support the pleat sidewalls against collapsing under fluid pressure. The spacers extend the length of the filter material and are preferably embedded in the end caps. One side edge 24 of a spacer 23 is flush with an outer pleat fold 25. The other side edge 26 of a spacer extends inwardly from the inner pleat fold 27 to protect the filter material 13 against damage from objects inserted in the central chamber. At the top and bottom of the inward extension of each spacer is provided a cut-out portion 28 to accommodate circular ridges 17 on the end caps. The resulting lips 29 of the cut-out portions 28 engage the ridges 17 to hold the spacers in radial position. The spacers 23 may consist of any well known relatively rigid material provided with a series of grooves or corrugations extending perpendicularly to the central axis of the unit as shown. The spacers preferably provide means allowing limited contact of the spacers with the filtering material. The supporting spacer material is also preferably made of, or is provided with a reflecting substance to aid in light transmission during inspection of the unit.

Although the supporting spacers are shown in the filter assembly as corrugated sheets having furrows with sharp edges to provide limited contact with the filtering material, it is recognized that the spacers may have any of various other forms. An example of a variation in spacer form consists of a sheet material provided with a series of rounder furrows so that the sheet touches the filtering material only along a line of tangency with the rounded surface. Although supporting spacers with corrugations perpendicular to the central axis of the unit are preferred to achieve maximum flow rate through the filter unit, it is also recognized that the corrugations might be disposed obliquely to the central axis.

Shown in FIGURE 7 is another example of a supporting spacer. A spacer may consist of a sheet of material provided with dimples or protrusions of similar nature extending away from the opposite faces of the material. Thus, a smaller degree of contact between the supporting spacer and the filtering material may be achieved by providing a series of bulges on the supporting spacer creating a point contact rather than a linear contact as created by the furrows of a corrugation.

Figure 8:
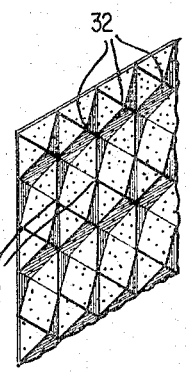
FIGURE 8 is a fragmentary perspective view showing a modified form of filtering material within the contemplation of this invention.

Referring to FIGURE 8, there is shown a form of filtering material employed in a filter cartridge constructed without spacers. The filtering material as shown is provided with protrusions 32 extending outward from one side of the material and protrusions 33 extending in the opposite direction from the other side of the filtering material. Pursuant to such construction, with oppositely directed protrusions, the protrusions are arranged linearly. As the material is pleated the protrusions extending from the downstream surfaces of each pleat will engage opposing protrusions at substantially the outermost point of each protrusion. Such construction provides a limited contact area and protects the pleats from collapsing. Although the filter material of FIGURE 8 is shown having linearly arranged protrusions extending from both sides of the filter material, it is recognized that a filter material may be provided with a system of closely spaced and randomly arranged protrusions extending from only one side of the filter material. Under such construction of the filter material the protrusions are preferably localized in specific areas. The filtering material prior to being folded into pleats has a successive and alternate arrangement of rectangular areas with protrusions adjacent to a rectangular areas without protrusions. Thus as the material is folded into pleats, the protrusions. Thus as the material is folded into pleats, the protrusions, extend from only one of the downstream surfaces of each pleat and engage the opposite, unprotruded downstream surface in point contact relation.

At least certain of the pleat folds may be provided with protective and reinforcing channel members 30 and 31. Preferably, all of the pleat folds are provided with such protection and reinforcement. Channel members 30 are provided to fit the upstream surface of the innermost folds 27 of the pleats. Associated with the upstream surface of the outermost folds 25 of the pleats are channel members 31 to protect the filter against handling damage. The channel members 30 and 31 extend the length of the filter material and are preferably embedded in the end caps. The channel members may be made of any suitable rust resistant material, for example, stainless steel.

It is therefore realized that the structure of this invention might be subject to numerous modifications well within the concepts of the invention as set forth in the appended claim.

Having thus described the details of the invention, what is claimed as new and novel and desired to be secured by Letters Patent is:

A removable fluid filter cartridge comprising a pair of end caps each having inner surfaces, a generally cylindrical filter media extending between and secured to said end caps, said filter media including a number of pleats, each pleat having end edges, one said end cap being provided with a port aligned with a central area defined by the inner surface of the filter media, a spacer positioned within each pleat of the filter and engaging the facing surfaces thereof, said end caps each having radially extending pleated members, said pleated members corresponding to said number of pleats in said filter media, said radially extending pleated members having vertical side walls and extending continuously around the outer peripheral surfaces of said end caps so that open areas are formed between adjacent pleated members, said filter media being secured to said end caps by inserting said end edges of said filter pleats into said radially extending pleated members such that said vertical side walls enclose said end edges, said inner surfaces of said each end cap includes a circular ridge formed thereon, said circular ridge having a top surface and a side surface facing the outer periphery of said end cap, said radially extending pleated members extending inwardly from the outer periphery of said each end cap nearly to said circular ridge, said circular ridge being in non-abutting relationship with said radially extending members, said spacers including longitudinal side edge portions extending inwardly into said central areas, said edge portions having lip portions which abut against said side surface and said top surface of said circular ridge to hold said spacers in a radial position and to form a seal between said lip portions and said circular ridge.

References Cited by the Examiner

UNITED STATES PATENTS

| | | | |
|---|---|---|---|
| 206,632 | 7/1878 | Snell | 210—498 |
| 323,680 | 8/1885 | Holden | 210—498 |
| 1,646,377 | 10/1927 | Sweetland et al. | 210—487 X |
| 2,747,744 | 5/1956 | Gretzinger | 210—487 X |
| 2,962,121 | 11/1960 | Wilber. | |
| 3,096,281 | 7/1963 | Smith et al. | 210—493 X |

FOREIGN PATENTS

| | | |
|---|---|---|
| 124,754 | 6/1947 | Australia. |
| 923,425 | 2/1947 | France. |
| 1,111,568 | 11/1955 | France. |
| 1,349,226 | 12/1963 | France. |
| 566,604 | 1/1945 | Great Britain. |
| 727,398 | 3/1955 | Great Britain. |

REUBEN FRIEDMAN, *Primary Examiner.*

SAMIH N. ZAHARNA, D. M. RIESS,
*Assistant Examiners.*